United States Patent
Fellows

[11] Patent Number: 6,112,966
[45] Date of Patent: Sep. 5, 2000

[54] DETACHABLE SNACK CONTAINER FOR STROLLER

[76] Inventor: Mary E. Fellows, 15 Sand Hill Rd., Sandyhook, Conn. 06482

[21] Appl. No.: 09/152,994

[22] Filed: Sep. 14, 1998

[51] Int. Cl.$^7$ .................................................. B60R 11/00
[52] U.S. Cl. .................... 224/409; 224/572; 224/433; 224/463
[58] Field of Search .................... 224/219, 221, 224/222, 400, 409, 411, 463, 428, 433, 437, 438, 439, 572

[56] References Cited

U.S. PATENT DOCUMENTS

| | | | |
|---|---|---|---|
| 1,352,863 | 9/1920 | Zeitler et al. | 224/221 |
| 1,577,298 | 3/1926 | Roeller | 224/409 |
| 2,762,377 | 9/1956 | Stephens | 224/219 X |
| 3,396,885 | 8/1968 | Giondi | 224/438 |
| 4,425,600 | 1/1984 | Barnhart | 224/219 X |
| 4,966,318 | 10/1990 | Dutka | 224/411 |
| 5,353,974 | 10/1994 | Maurizio | 224/219 |
| 5,601,356 | 2/1997 | McWilliams | 224/221 X |
| 5,702,038 | 12/1997 | Miller et al. | 224/409 |

FOREIGN PATENT DOCUMENTS

| | | | |
|---|---|---|---|
| 548313 | 11/1959 | Belgium | 224/409 |
| 375393 | 7/1907 | France | 224/219 |
| 56500 | 4/1936 | Norway | 224/409 |
| 140275 | 8/1930 | Switzerland | 224/219 |
| 197750 | 8/1938 | Switzerland | 224/409 |

*Primary Examiner*—Gregory M. Vidovich
*Attorney, Agent, or Firm*—St. Onge Steward Johnston & Reens LLC

[57] ABSTRACT

A container for holding snacks which is attachable to and detachable from a stroller is provided. The snack container includes a fabric lined basket. The basket includes side walls and front and back walls, with the front and back walls being lower than the side walls to facilitate snack access and retrieval. A set of fastener strips, preferably hook and loop fastener strips lined with ribbon, is attached to the basket such that the snack container is detachably mountable onto a member, such as the cross bar of a stroller. The snack container also includes a nonslidable cork base such that when the snack container is attached onto the member, the base inhibits sliding between the snack container and the member.

7 Claims, 2 Drawing Sheets

DETACHABLE SNACK CONTAINER FOR STROLLER

FIELD OF THE INVENTION

The present invention relates to a snack container, and more particularly to a container for holding snacks which is attachable to and detachable from a stroller. In another aspect, the present invention relates to a stroller having such a snack container.

BACKGROUND OF THE INVENTION

Children are often required to sit in strollers for extended periods of time, for example, during long walks and shopping trips with their parents. During these times, the children may become hungry, and therefore agitated. For this reason, the prudent parent will usually have some sort of snack to mollify the child until mealtime. This food is often kept in a sandwich bag or similar plastic bag, as such bags are convenient and fit easily into a purse or pocket. These bags, however, are dangerous to the child, as the child may decide to play with the bag, and may choke or suffocate, as is commonly known. Thus, instead of giving the child the bag containing the snacks the parent must give the child the snacks one at a time, which is inconvenient.

An alternative is to give the child a container, such as a plastic bowl, with the snacks therein. This alternative disadvantageously requires the parent to carry around the container, which may not fit easily into a purse or pocket. Another disadvantage is that the child may spill the contents of the container, thereby losing the snacks and remaining hungry and agitated. Furthermore, the child may drop the container, and thereby lose the container itself.

What is desired, therefore, is a container for holding snacks which holds a plurality of snacks, which is safe for use by young children, which does not have to be carried by the parent, which may not be easily lost by the child, and which inhibits the spilling of snacks by the child.

SUMMARY OF THE INVENTION

Accordingly, it is an object of the present invention to provide a container for holding snacks.

Another object of the present invention is to provide a container for holding snacks which holds a plurality of snacks.

A further object of the present invention is to provide a container for holding snacks having the above characteristics and which is safe for use by young children.

Still a further object of the present invention is to provide a container for holding snacks having the above characteristics and which does not have to be carried around by the parent.

Still another object of the present invention is to provide a container for holding snacks having the above characteristics and which may not be easily lost by the child.

Yet a further object of the present invention is to provide a container for holding snacks having the above characteristics and which inhibits the spilling of snacks by the child.

These and other objects of the present invention are achieved by provision of a snack container having a fabric lined basket. The basket includes side walls and front and back walls, with the front and back walls being lower than the side walls to facilitate snack access and retrieval. A set of fastener strips, preferably hook and loop fastener strips lined with ribbon, is attached to the basket such that the snack container is detachably mountable onto a member, such as the cross bar of a stroller. The snack container also includes a nonslidable cork base such that when the snack container is attached onto the member, the base inhibits sliding between the snack container and the member.

The invention and its particular features and advantages will become more apparent from the following detailed description considered with reference to the accompanying drawings.

DETAILED DESCRIPTION OF THE INVENTION

Figure 1:
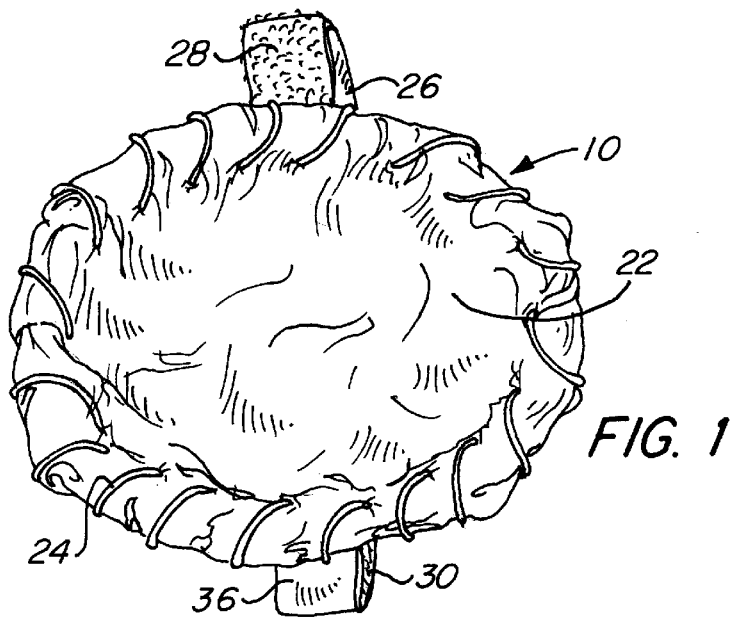
FIG. 1 is a top plan view of a snack container in accordance with the present invention.
Figure 2:
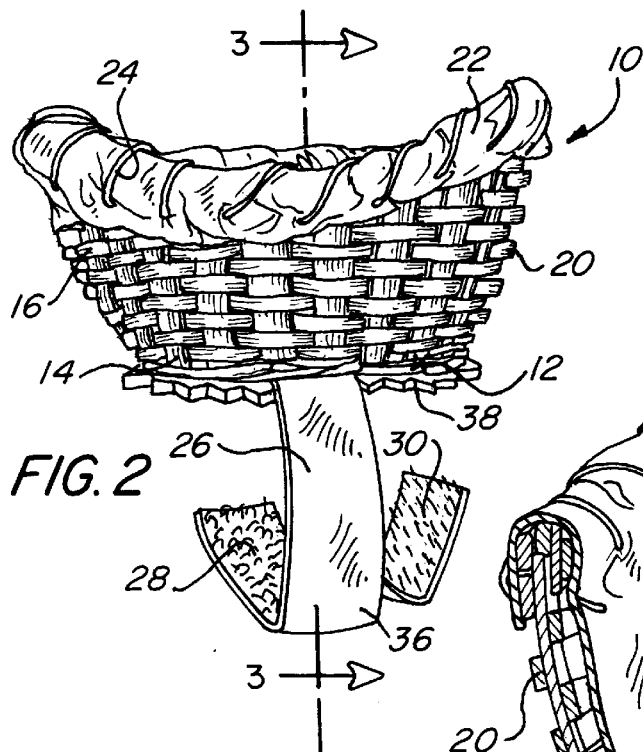
FIG. 2 is a side plan view of the snack container of FIG. 1.
Figure 3:
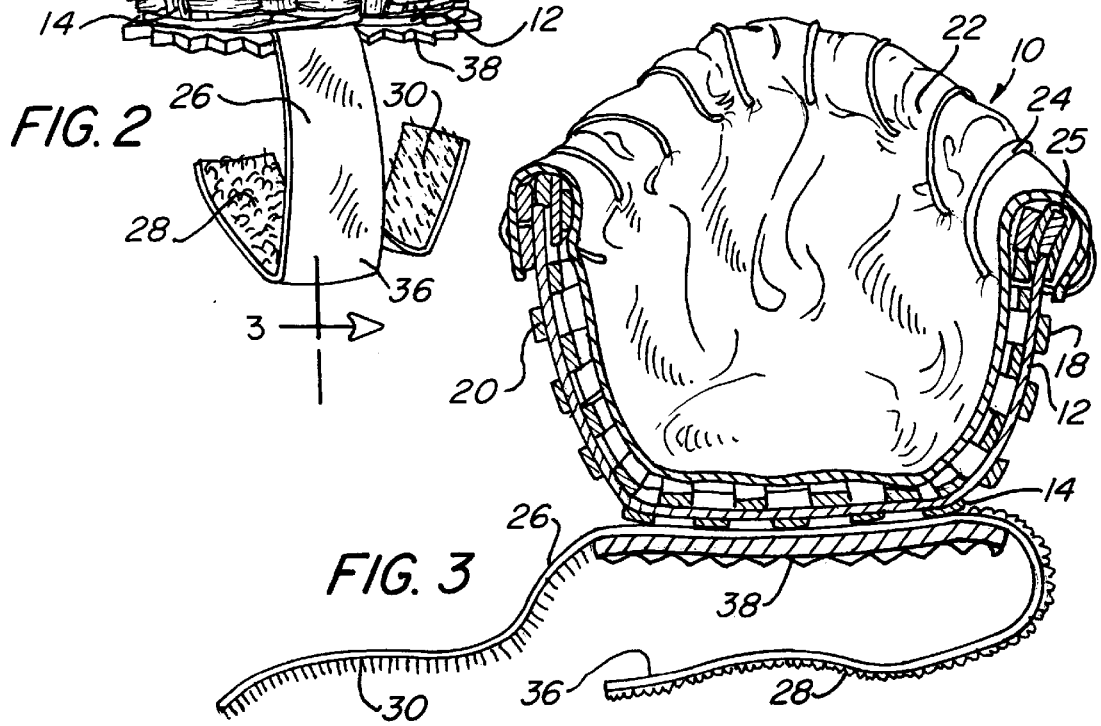
FIG. 3 is a partially cross-sectional side view of the snack container taken along line 3—3 of FIG. 2.

Referring first to FIGS. 1 through 3, a snack container 10 in accordance with the present invention is shown. The snack container 10 includes a basket 12, which preferably comprises a woven reed or wicker basket, which are commonly known. Basket 12 is preferably generally oval shaped and includes a bottom wall 14, side walls 16, front wall 18 and back wall 20. Side walls 16 of basket 12 are preferably higher than front wall 18 and back wall 20 to facilitate snack access and retrieval by the child while still retaining a plurality of snacks. Alternately, front wall 18 may be of substantially the same height as side walls 16, with only back wall 20, the wall which faces the child, being lower.

Disposed within basket 12 is a piece of fabric 22, which acts to line basket 12. Fabric 22 is shaped to correspond to the dimensions of basket 12, but is generally oval shaped when basket 12 is oval shaped. Fabric 22 is preferably an organic cotton material, such as muslin, and may or may not be dyed or bear a pattern or design, such as the house brand of the manufacturer. The periphery of fabric 22 extends out from the interior of basket 12 and is doubled back over a portion of the outer surface of basket 12. Fabric 22 is attached to basket 12 by a series of stitching 24 which extends around the periphery of basket 12. Fabric 22 lines basket 12 so as to inhibit pieces of snack from becoming lodged between the reeds of basket 12, which may lead to an unsanitary condition, as well as to provide an aesthetically pleasing appearance. The doubled-over periphery of fabric 22 pads the upper edge 25 of basket 12, which may otherwise irritate or injure a child's delicate skin.

Figure 4:
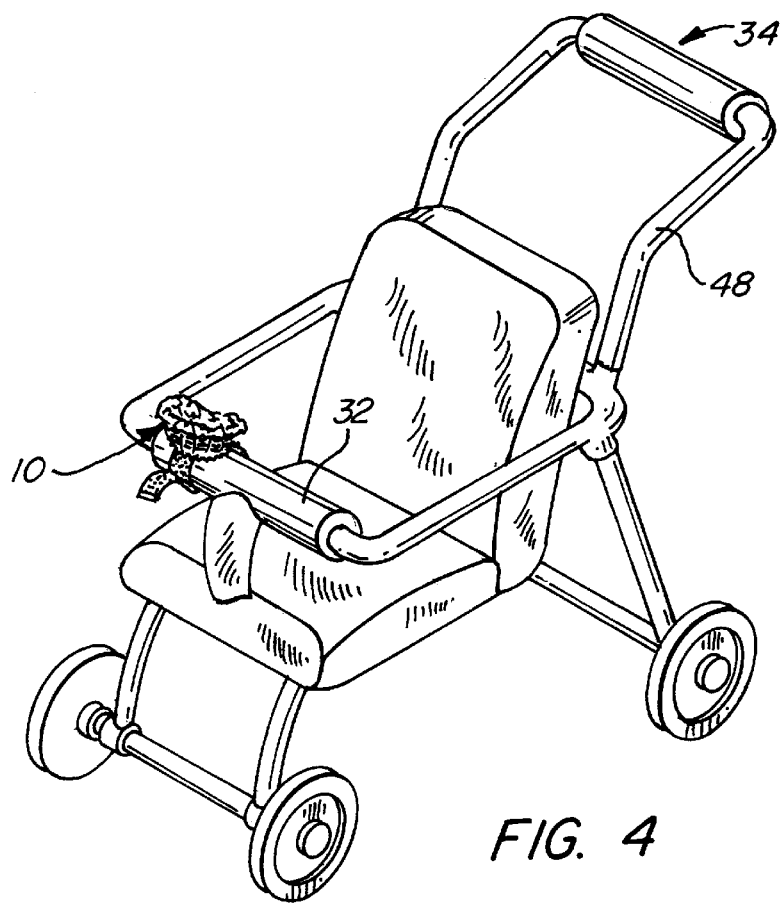
FIG. 4 is an isometric side view of the snack container of FIG. 1 shown attached to a stroller.

Attached to bottom wall 14 of basket 12 are fastening strips 26. Strips 26 extend outward perpendicular to front wall 18 and back wall 20. Strips 26 may comprise ribbons, laces, string, yarn, or the like, which may be tied about a member to accomplish attachment of snack container 10 thereto. Preferably, however, strips 26 comprise a set of hook and loop fastener strips. As shown in FIG. 3, when hook and loop fastener strips are used, loop strip 28 may extend outward with the loops facing upward, while hook strip 30 extends outward with the hooks facing downward. It should be noted that it is equally possible that the hooks of hook strip 30 may face upward with the loops of loop strip 28 facing downward, so long as the hooks of hook strip 30 engage the loops of loop strip 28 when fastening strips 26 are wrapped about a member, such as the cross bar 32 of a stroller 34, as shown in FIG. 4.

When hook and loop fastener strips 26 are used, fastening strips 26 are preferably backed with ribbon 36. Ribbon 36 is preferably formed from an organic cotton material, and may or may not be dyed or bear a pattern or design, such as the house brand of the manufacturer. If desired, the ribbon 36 backing one of fastening strips 26 may be different from the ribbon 36 backing the other. For example, with respect to FIG. 3, ribbon 36 backing loop strip 28 may bear the house brand of the manufacturer while ribbon 36 backing hook strip 30 may bear no design. Thus, the house brand may appear on the product in an inconspicuous, and non-garish manner, as the design will not be visible once the snack container 10 is attached to stroller 34.

Figure 5:
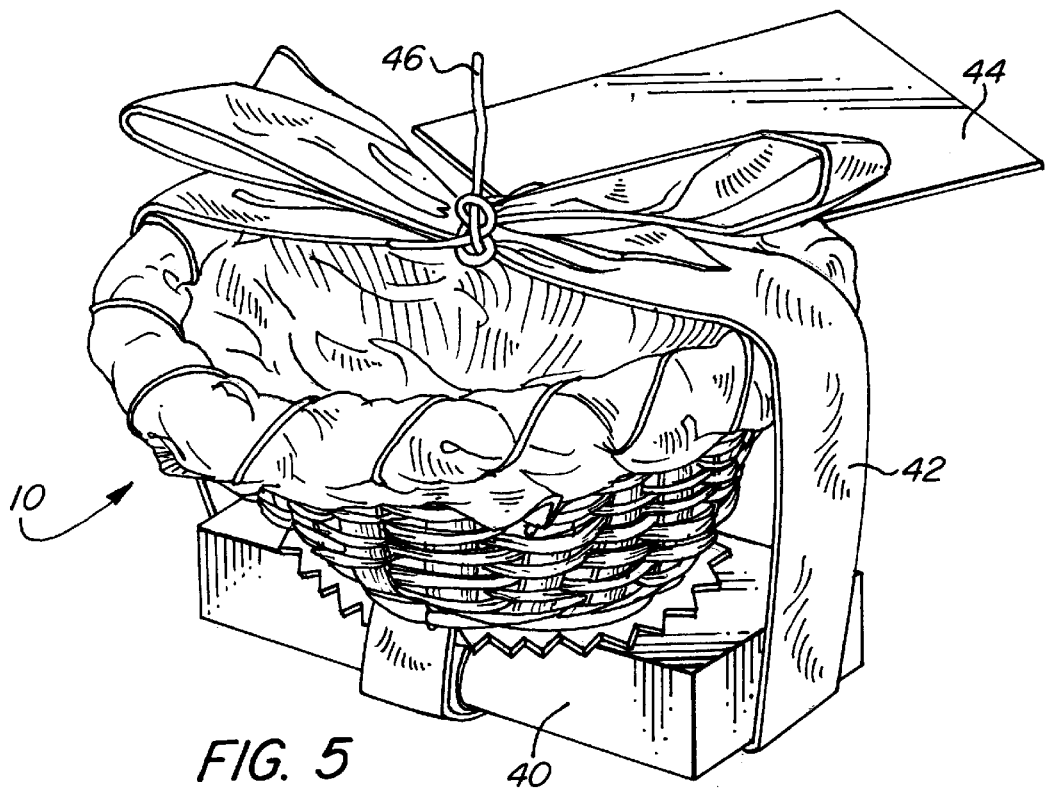
FIG. 5 is an isometric side view of the snack container of FIG. 1 shown as marketed and sold.

Attached to bottom wall 14 of basket 12, and preferably covering the ends of fastening strips 26 attached to basket 12, is nonslidable base 38. Nonslidable base 38 is sized and shaped corresponding to, and being slightly larger than, the periphery of bottom wall 14 of basket 12. Preferably, the periphery of nonslidable base 38 is cut in an ornamental pattern, as best seen in FIGS. 2 and 5, to contribute to an aesthetically pleasing product. Nonslidable base 38 is formed from a material having a high coefficient of friction so that once snack container 10 is mounted on cross bar 32 of stroller 34, nonslidable base 38 inhibits snack container 10 from lateral movement along cross bar 32, as well inhibits snack container 10 from spinning about cross bar 32. Preferably, nonslidable base 38 is stamped from a sheet of organic cork material.

Referring now to FIG. 5, snack container 10 is shown as marketed and sold. Snack container 10 is mounted on wooden block 40 to demonstrate how fastening strips 26 are used to mount snack container 10 to cross bar 32 of stroller 34. A ribbon 42 is tied around snack container 10 and wooden block 40 to contribute to an aesthetically pleasing product. Ribbon 42 is preferably formed from an organic cotton material, and may or may not be dyed or bear a pattern or design, such as the house brand of the manufacturer. A label 44 is attached to ribbon 42 with a piece of string 46. Label 44 may include information about the manufacturer and information about the product.

Referring now specifically to FIG. 4, a typical stroller 34 is shown with a snack container 10 according to the present invention attached to the cross bar 32 thereof. As is shown, snack container 10 is positioned within easy reach of a child seated in stroller 34. As such, snack container 10 may be filled with a plurality of snacks, and the child may eat them as desired. Also as shown, snack container 10 does not have to be carried by the parent, as the snack container 10 may be left attached to the cross bar 32 even when not filled with snacks. Alternately, snack container 10 may be just as easily attached to stroller 34 out of the reach of the child if desired, for example, along push bar assembly 48. Moreover, as snack container 10 is attached to stroller 34, it is not easily dropped and lost by the child. Furthermore, since base 38 inhibits rotation of snack container 10 about cross bar 32, the child will not easily spill the snacks provided. Finally, the snack container 10 of the present invention is safe for children, as it does not include parts upon which the child may choke or suffocate, and, except for the hook and loop fastener strips, is made completely of organic materials so that the child will not be poisoned by foreign substances.

The present invention, therefore, provides a container for holding snacks which holds a plurality of snacks, which is safe for use by young children, which does not have to be carried around by the parent, which may not be easily lost by the child, and which inhibits the spilling of snacks by the child.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A snack container comprising:

a basket, said basket comprising side walls, a front wall, and a back wall, the back wall being lower than the side walls to facilitate snack access and retrieval from the back wall;

fabric lining said basket, the fabric being doubled back over a top edge of said basket;

a set of hook and loop fastener strips attached to said basket such that the snack container is detachably mountable onto a member, said hook and loop fastener strips being backed with ribbon; and a nonslidable base attached to said basket such that when the snack container is mounted onto the member, said base inhibits sliding between the snack container and the member.

2. The snack container of claim 1 wherein the front wall of said basket is lower than the side walls to facilitate snack access and retrieval from either the front wall or back wall.

3. The snack container of claim 2 wherein said nonslidable base comprises a nonslidable cork base.

4. The snack container of claim 3 wherein said base is attached to said basket such that said base covers the ends of said set of hook and loop fastener strips attached to said basket.

5. A snack container comprising:

a basket having side walls, a front wall, and a back wall, the front wall being lower than the side walls to facilitate snack access and retrieval;

fabric disposed within said basket to line said basket, the fabric being doubled back over a top edge of said basket;

a set of hook and loop fastener strips attached to said basket such that the snack container is detachably mountable onto a member, said hook and loop fastener strips being backed with ribbon; and a nonslidable cork base such that when the snack container is mounted onto the member, said base inhibits sliding between the snack container and the member.

6. The snack container of claim 5 wherein said base is attached to said basket such that said base covers the ends of said set of hook and loop fastener strips attached to said basket.

7. A stroller comprising:

a cross bar;

a container for holding snacks detachably mounted on said cross bar, said container comprising:

a basket having side walls, a front wall, and a back wall, the front wall being lower than the side walls to facilitate snack access and retrieval;

fabric disposed within said basket to line said basket, the fabric being doubled back over a top edge of said basket;

a set of hook and loop fastener strips attached to said basket such that the snack container is detachably mountable onto a member, said hook and loop fastener strips being backed with ribbon; and a nonslidable cork base such that when the snack container is attached onto the member, said base inhibits sliding between the snack container and the member.

* * * * *